US006442398B1

(12) United States Patent
Padovani et al.

(10) Patent No.: US 6,442,398 B1
(45) Date of Patent: Aug. 27, 2002

(54) METHOD AND APPARATUS FOR REVERSE LINK LOADING ESTIMATION

(75) Inventors: Roberto Padovani; Bruce A. Judson, both of San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/409,943

(22) Filed: Sep. 30, 1999

Related U.S. Application Data

(63) Continuation-in-part of application No. 09/204,616, filed on Dec. 3, 1998, now Pat. No. 6,192,249.

(51) Int. Cl.[7] .............................................. H04B 7/00
(52) U.S. Cl. ...................... 455/522; 455/453; 455/67.1
(58) Field of Search ........................... 455/453, 522, 455/67.1, 423, 115; 370/252, 249, 342, 229

(56) References Cited

U.S. PATENT DOCUMENTS

| | | | |
|---|---|---|---|
| 4,225,976 A | | 9/1980 | Osborne et al. ............ 455/226 |
| 5,023,900 A | * | 6/1991 | Tayloe et al. .................. 379/32 |
| 5,056,109 A | | 10/1991 | Gilhousen et al. .............. 375/1 |
| 5,257,283 A | | 10/1993 | Gilhousen et al. .............. 375/1 |
| 5,265,119 A | | 11/1993 | Gilhousen et al. .............. 375/1 |
| 5,267,261 A | | 11/1993 | Blakeney, II et al. ........... 375/1 |
| 5,267,262 A | | 11/1993 | Wheatley, III .................. 375/1 |
| 5,448,600 A | | 9/1995 | Lucas ............................ 375/205 |
| 5,548,812 A | * | 8/1996 | Padovani .................... 455/33.2 |
| 5,559,790 A | | 9/1996 | Yano et al. ..................... 370/18 |
| 5,754,533 A | | 5/1998 | Bender et al. ............... 370/252 |
| 5,784,410 A | * | 7/1998 | Nakano ....................... 375/345 |
| 5,859,838 A | * | 1/1999 | Soliman ....................... 370/249 |
| 5,943,617 A | * | 8/1999 | Nakamura ................... 455/423 |
| 5,960,353 A | * | 9/1999 | Lee .............................. 455/453 |
| 6,052,584 A | * | 4/2000 | Harvey et al. ............... 455/423 |
| 6,192,249 B1 | * | 2/2001 | Padovani .................... 455/453 |

FOREIGN PATENT DOCUMENTS

| | | | |
|---|---|---|---|
| EP | 0668662 | 8/1995 | |
| EP | 0673125 | 9/1995 | |
| WO | 9824199 | 6/1998 | ........... H04B/17/00 |
| WO | WO 98/24199 | * 6/1998 | ........... H04B/17/00 |
| WO | 0033475 | 6/2000 | |

* cited by examiner

*Primary Examiner*—Daniel Hunter
*Assistant Examiner*—Charles Chow
(74) *Attorney, Agent, or Firm*—Philip Wadsworth; Kent D. Baker; Pavel Kalousek

(57) ABSTRACT

In one embodiment of method and appartus for determining loading in a communication system, the communication system accumulates a power control commands series and corresponding transmit gain adjustments series between a base station and a designated remote station, under regular operating conditions. After transmissions form the remaining remote stations are interrupted, the communication system repeats the accumulation, and determines the loading according to the accumulated series. Alternatively, the communication system measures power of a test signal injected into base station receiver, under regular operating conditions. After transmissions form the remote stations are interrupted, the communication system repeats the measurement, and determines the loading according to the two measurements. Alternatively, the communication system measures gain of an AGC at the base station's receiver, under regular operating conditions. After transmissions form the remote stations are interrupted, the communication system repeats the measurement, and determines the loading according to the two measurements.

53 Claims, 9 Drawing Sheets

METHOD AND APPARATUS FOR REVERSE LINK LOADING ESTIMATION

CROSS REFERENCE INFORMATION

This application is a continuation-in-part of application Ser. No. 09/204,616, now U.S. Pat. No. 6,192,249, filed Dec. 3, 1998.

BACKGROUND OF THE INVENTION

1. Field of the Invention

The invention relates to communication systems. More particularly, the invention relates to load estimation in a multiple access system.

2. Description of the Related Art

FIG. 1 is an exemplifying embodiment of a terrestrial wireless communication system 10. FIG. 1 shows three remote units 12A, 12B and 12C and two base stations 14. In reality, typical wireless communication systems may have many more remote units and base stations. In FIG. 1, the remote unit 12A is shown as a mobile telephone unit installed in a car. FIG. 1 also shows the portable computer remote unit 12B and the fixed location remote unit 12C such as might be found in a wireless local loop or meter reading system. In the most general embodiment, the remote units may be any type of communication unit. For example, the remote units can be hand-held personal communication system (PCS) units, portable data units such as a personal data assistant, or fixed location data units such as meter reading equipment. FIG. 1 shows a forward link signal 18 from the base stations 14 to the remote units 12 and a reverse link signal 20 from the remote units 12 to the base stations 14.

In a typical wireless communication system, such as that illustrated in FIG. 1, some base stations have multiple sectors. A multi-sectored base station comprises multiple independent transmit and receive antennas as well as independent processing circuitry. The principles discussed herein apply equally to each sector of a multi-sectored base station and to a single sectored independent base station. For the remainder of this description, therefore, the term "base station" can be assumed to refer to either a sector of a multi-sectored base station or a single sectored base station.

In a code division multiple access (CDMA) system, remote units use a common frequency bandwidth for communication with all base stations in the system. Use of a common frequency bandwidth adds flexibility and provides many advantages to the system. For example, use of a common frequency bandwidth enables a remote unit to simultaneously receive communication signals from more than one base station, as well as transmit a single signal for reception by more than one base station. The remote unit discriminates the simultaneously received signals from the various base stations through the use of the spread spectrum CDMA waveform properties. Likewise, the base station can discriminate and separately receive signals from a plurality of remote units.

Various methods exist for transferring communication with the remote unit from one base station to another through a process known as handoff. Handoff may be necessary if a remote unit operating in the coverage area of an original base station moves into the coverage area of a target base station. One method of handoff used in CDMA systems is termed a "soft" handoff. Through the use of soft handoff, communication with the target base station is established before termination of communication with the original base station. When the remote unit is communicating with two base stations, both the remote unit and base stations create a single signal from the multiple received signals. Through the use of soft handoff, communication between the remote unit and the end user is uninterrupted by the eventual handoff from the original base station to the target base station. U.S. Pat. No. 5,267,261 entitled "MOBILE STATION ASSISTED SOFT HANDOFF IN A CDMA CELLULAR COMMUNICATIONS SYSTEM," assigned to the assignee of the present invention and incorporated herein by this reference, discloses a method and system for providing communication with a remote unit through more than one base station during the handoff process.

In a wireless system, maximizing the capacity of the system in terms of the number of simultaneous calls that can be handled is extremely important. System capacity in a spread spectrum system is increased if the power received at the base station from each remote unit is controlled such that each signal arrives at the base station receiver at the minimum level required to maintain the link. If a signal transmitted by a remote unit arrives at the base station receiver at a power level that is too low, the signal to interference ratio may be too low to permit high quality communication with the remote unit. If, on the other hand, the remote unit signal arrives at a power level that is too high, communication with this particular remote unit is acceptable, but the high power signal acts as unnecessary interference to other remote units. This unnecessary interference may adversely affect communications with other remote units. Thus, in general, a remote unit located near the base station transmits a relatively low signal power while a remote unit located at the edge of the coverage area transmits a relatively high signal power.

In standard CDMA systems, in order to increase capacity, the power transmitted by a remote unit over the reverse link is controlled by each base station through which active communication is established (i.e. each base station with which the remote unit is in soft handoff.) Each base station through which communication is established measures the received signal quality and compares it to a desired set point. Each base station, periodically, generates and sends a power adjustment command to the remote unit. The power adjustment commands puncture the user traffic data on the forward link traffic channel.

The power adjustment command orders the remote unit to either increase or decrease the power at which it is transmitting the reverse link signal. The remote unit increases its transmit power level only if every base station commands an increase. In this way, the transmit signal power of a remote unit in soft handoff is controlled mainly by the base station which receives its signal at the highest signal quality. A system for base station and remote unit power control is disclosed in U.S. Pat. Nos. 5,056,109, 5,265,119, 5,257,283 and 5,267,262 which are assigned to the assignee hereof.

In more advanced systems, in addition to controlling the power level at which the remote unit transmits on the reverse link, the data rate at which the remote unit transmits on the reverse link is also controlled. A remote unit located on the edge of a coverage area can reduce the data rate at which it transmits in order to increase the signal quality of the signal as received at the base station. By reducing the data rate, the time devoted to each bit may be increased, thus, increasing the energy devoted to each bit and increasing the performance of the link. A remote unit which transmits at less than the full rate generates less interference and consumes less system resources than a remote unit transmitting at full rate, thereby, freeing system resources for use by other remote units.

The power adjustment commands compensate for the time-varying path loss in the wireless channel. Path loss in the wireless channel is defined as degradation or loss suffered by a signal as it travels between the remote unit and the base station. Path loss is characterized by two separate phenomenon: average path loss and fading. In a typical wireless system, the forward link and reverse link operate on different frequencies. Nevertheless, because the forward and reverse links operate within the same frequency band, a significant correlation exists between the average path loss of the two links. On the other hand, fading is an independent phenomenon for the forward and reverse link and varies rapidly as a function of time, especially when the remote unit is in motion or is located near objects in motion.

In an exemplifying wireless system, each remote unit estimates the path loss of the forward link based on the total power at the input of the remote unit. The total power is the sum of the power from all base stations operating on the same frequency assignment as perceived by the remote unit. From the estimate of the average forward link path loss, the remote unit sets a nominal transmit power level of the reverse link signal. As noted above, each base station with which the remote unit has established communications sends power adjustment commands to the remote unit to compensate for differences between the path loss on the forward link and the path loss on the reverse link, for fading, and for other sources of error. Thus, the remote unit creates a reverse link transmit gain adjustment signal which increases or decreases the reverse link transmit power level above or below the nominal level determined by estimating the average forward link path loss. The value of the transmit gain adjustment signal is the accumulated effect of the power control adjustment commands received from the base station over a period of time. If the remote unit receives an equal number of turn-up and turn-down commands, the value of the transmit gain adjustment signal is zero and the reverse link transmit level is equal to the nominal value. If the remote unit receives more turn-up than turn-down commands, the value of the transmit gain adjustment signal is logically positive and the reverse link transmit level is greater than the nominal value. If the remote unit receives more turn-down than turn-up commands, the value of the transmit gain adjustment signal is logically negative and the reverse link transmit level is less than the nominal value.

If a minimum acceptable signal quality is specified, an upper bound on the number of simultaneous users which can communicate through a base station can be calculated. This upper bound is commonly referred to as the pole capacity of a system. The ratio of the actual number of users to the pole capacity is defined as the loading of the system. As the number of actual users approaches the pole capacity, loading approaches unity. A loading close to unity implies potentially unstable behavior of the system. Unstable behavior can lead to degraded performance in terms of voice quality, high error rates, failed handoffs, and dropped calls. In addition, as loading approaches unity, the size of the coverage area of the base station shrinks such that users on the outer edge of the no-load coverage area are no longer be able to transmit sufficient power to communicate with the base station at an acceptable signal quality.

For these reasons, it is advantageous to limit the number of users which access the system such that loading does not exceed a specified percentage of the pole capacity. One way to limit the loading of the system is to deny access to the system once the loading of the system has reached a predetermined level. For example, if the loading increases above 70% of the pole capacity, it is advantageous to deny requests for additional connection originations and to refrain from accepting hand-off of existing connections.

In order to limit the loading on the reverse link to a specified level, it is necessary to measure the reverse link loading. Reverse link loading of a base station is not solely a function of the number of remote units that are operating within the coverage area of the base station. Reverse link loading is also a function of interference from other sources. The front-end noise of the base station itself is a significant source of interference. In addition, other remote units operating on the same frequency within the coverage area of nearby base stations may contribute significant interference.

One means by which the reverse link loading can be measured is by averaging the measured signal to interference operation point of all active connections within the coverage area. This approach has several drawbacks. The signal to interference operation statistics of the active connections provide an indication of system performance. However, they do not provide any information concerning the amount of interference from remote units located in the coverage area of other base stations. In addition, when a remote unit is in soft hand-off between two or more base stations, it is likely that the actual signal to interference ratio at which the reverse link signal is received at any one base station is significantly beneath the signal to interference ratio set point determined by the system, thus, falsely indicating an extremely high loading level. For these reasons, measuring the average signal to interference operation point of all active connections within a base station does not provide an accurate measure of reverse link loading.

A second and simple means of determining reverse link loading is to simply count the number of active users in the base station. However, because the level of interference from other sources significantly affects loading, it should be clear that the number of users is not necessarily a good indication of reverse link loading. In addition, the effects of soft hand-off greatly decrease the correlation between the number of active users and the actual loading at the base station.

A third means of estimating the reverse link loading is to attempt to derive the reverse link loading based upon an estimate of the forward link loading. However, as noted above, in a typical system the forward and reverse link do not operate at the same frequencies. Therefore, the forward link performance is not perfectly correlated with reverse link performance. For example, the interference from the coverage areas of adjacent base stations can be different on the forward link than on the reverse link. In addition, as noted above, the effects of fading are independent as between the forward and reverse links.

If one of these inaccurate methods of estimating the reverse link loading is used, the system cannot accurately determine whether connection blockage is necessary. If calls are blocked unnecessarily, the capacity of the system is unnecessarily decreased. On the other hand, if the loading is permitted to approach the pole capacity, the probability of dropping a significant number of active connections increases. For this reason, it is important to have an accurate estimation of the reverse link loading.

In his book entitled "CDMA: Principles of Spread Spectrum Communication" (Addison-Wesley Wireless Communications, 1995), Dr. Andrew J. Viterbi defines reverse link loading as a function of the total received power perceived at the base station receiver. The reverse link loading X is directly related to the total power received by the base station according to the following formula:

$$\frac{P_a}{P_n} = \frac{1}{1-X} \quad (1)$$

where:

P$_a$ is the actual power received at the base station;

P$_n$ is the power received at no external loading (e.g. the power due to the thermal noise floor of the base station); and X is the reverse link loading in terms of the ratio of actual loading to pole capacity.

Or equivalently, expressed in terms of X, Equation 1 takes on the following expression:

$$X = \frac{P_a - P_n}{P_a} \quad (2)$$

For example, this formula states that at 50% loading (X=0.5), the total power received at the base station is twice that which is received at no loading.

Given the relationship shown in Equation 1, current base station loading X can be determined based upon a known no load power level and an actual measurement of the total power received at the base station. Note that the actual power measurement should be filtered with an appropriate time constant in view of the time constant at which the power control operation varies the transmit power of the remote unit. In addition, if the reverse link operates at variable data rates which result in gated transmissions from the remote units, the actual power measurement should be filtered to average the effects of the gated transmissions on the instantaneous power measurement.

The dynamic range of the relative power measurement (P$_a$/P$_n$) is not large in a typical system. For example, as the loading X increases from 0 to 90% of the pole capacity, the ratio of (PJP$_n$) increases from 0 to 10 decibels (dB). Typically, base station loading X is limited to about 60–75% of the pole capacity. As X increases from 0.6 to 0.75, the ratio of (P$_a$/P$_n$) increases from about 4 to about 6 dB. Therefore, to accurately limit the loading of the reverse link, the ratio of (P$_a$/P$_n$) should be measured with less than 1 dB of error in order to avoid over- or under-estimation of the loading.

While this approach appears to be straight-forward, in reality, it is difficult to consistently achieve the required accuracy of the relative power measurements. The difficulty stems from the complexity of making absolute power measurement of both P$_n$ and P$_a$, within required accuracy of a few dB. Furthermore, even if an accurate absolute measurement of the noise floor could be made at one time, the noise floor is sensitive to gain and noise figure variations due to temperature, aging and other phenomenon and, hence, the noise floor power level changes as a function of time. Without a means of accurate measurement, any admission control algorithm based upon Equation 2 will likely block connections when no blocking is necessary or admit connections in the face of potentially unsteady system behavior.

For these reasons, there has been a long felt need in the industry for a method and apparatus for accurately estimating the reverse link loading of a system.

SUMMARY OF THE INVENTION

In order to determine a current level of loading, a system enters a period of silence, in which reverse link transmissions are inhibited.

In one embodiment of the invention, a remote test unit generates a reverse link signal during the period of silence. A base station demodulates the reverse link signal and generates a series of closed loop power control commands for the remote unit. The remote unit responds to the power control commands by adjusting the level at which it transmits the reverse link signal. As the system operating point changes in response to the new operating conditions, the series of commands are accumulated to determine a transmit gain adjustment value corresponding to the period of silence, TGA(0). Once normal system operation is resumed, the base station demodulates the reverse link signal from the remote test unit and generates a series of power control commands for the remote unit. As the system operating point changes in response to the normal operating conditions once again, the series of power control commands are accumulated to determine a transmit gain adjustment value for the current system loading, TGA(t). Using TGA(0) and TGA(t), the system loading is determined.

In another embodiment of the invention, a known low energy deterministic signal is injected into the base station receiver prior to signal-to-strength detection circuit. During the period of silence, a signal-to-noise ratio due to this SS signal is measured, and used as a calibrated reference for the noise floor P$_n$. Once normal system operation is resumed, the signal-to-noise ratio due to this signal, now degraded by other reverse link signals, is measured, and used as a measure of the power level P$_n$. The load is then calculated using these measurements. At the next period of silence a new calibrated reference measurement reflecting the noise floor P$_n$ is taken. Once normal system operation is resumed, and measurements of the reverse link signal P$_a$ are taken, the load is calculated using this new P$_n$.

In yet another embodiment of the invention, during the period of silence, the base station receiver makes an observation, which provides a calibrated reference for the noise floor P$_n$. Once normal system operation is resumed, the base station receiver takes measurements of the reverse link signal P$_n$. The load is then calculated by means of Equation 2. At the next period of silence a new calibrated reference measurement of the noise floor P$_n$ is taken. Once normal system operation is resumed, and measurements of the reverse link signal P$_a$ are taken, Equation 2 is again utilized, using this new P$_n$. Thus, this approach eliminates the need for an absolute power measurement, and accounts for any drift caused with physical phenomena.

BRIEF DESCRIPTION OF THE DRAWINGS

The features, objectives, and advantages of the invention will become more apparent from the detailed description set forth below when taken in conjunction with the drawings.

DETAILED DESCRIPTION OF THE INVENTION

Figure 1:
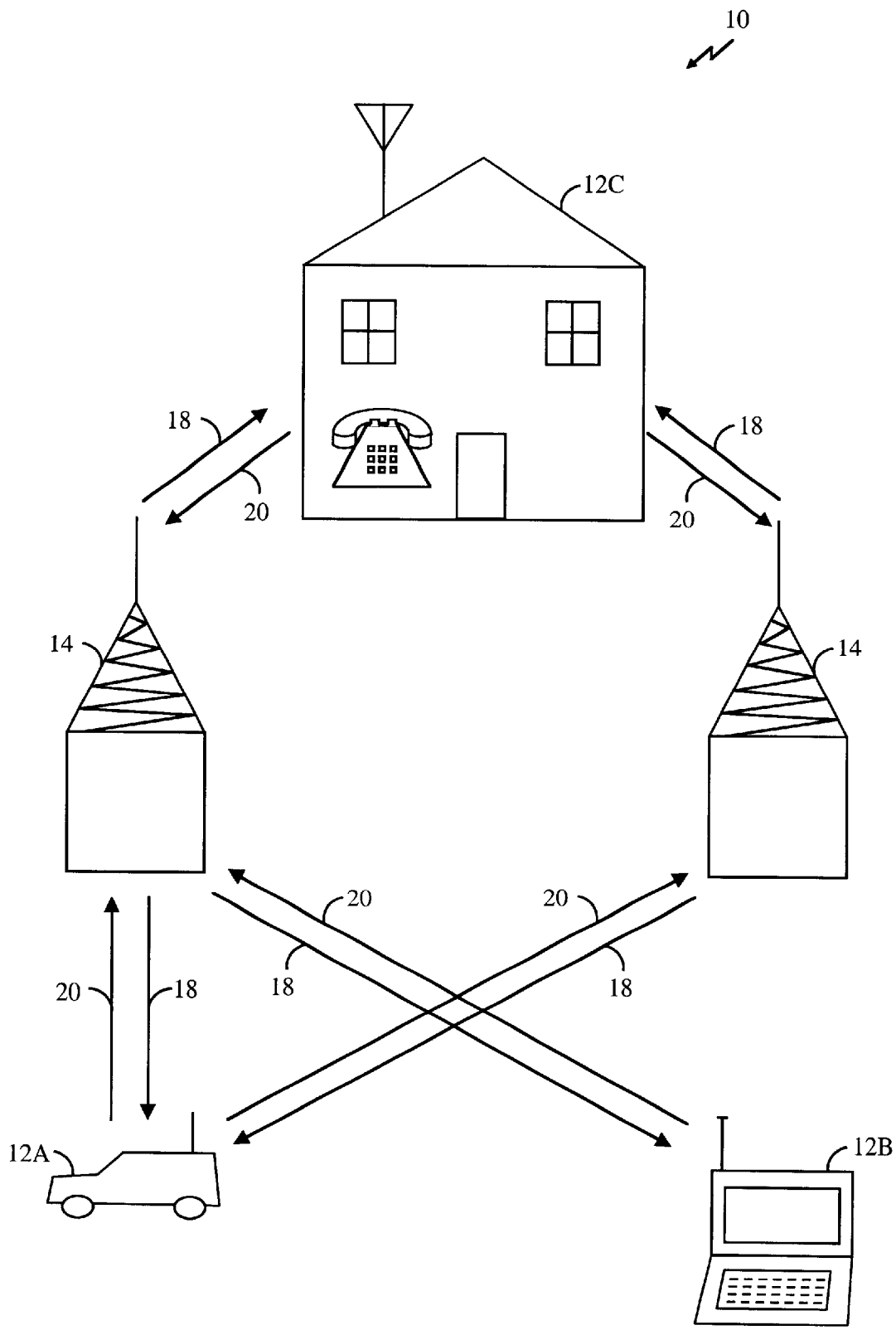
FIG. 1 is a conceptual drawing showing an exemplifying embodiment of a terrestrial wireless communication system.

A means and method of determining the current system loading is proposed by the current invention which provides an accurate estimation of current system loading. In general, two main issues are involved in the determination of current system loading. First, a determination must be made of the power received at the base station with no external loading, such as, due to the thermal noise generated by the base station circuitry. As noted above, the power received with no external loading is a function of temperature and aging as well as other effects. Thus, the determination of the power received at no external loading is a function of time and must be determined repeatedly throughout operation. But, as also noted above, such a determination is difficult to make in an operating CDMA system because adjacent base stations operate within a common frequency band, thus, causing interference at the base station in question even if no remote units are active in the base station in question.

The power received at no external loading can be measured during periods of low traffic such as at night. However, even during low traffic periods, there is no assurance that remote units in the coverage area of neighboring base stations are inactive. In addition, day-time and night-time temperature conditions can vary significantly, thus, greatly decreasing the correlation between a no load power measurement made at midnight to the actual noise floor of the system at noon the next day.

Second, a determination of the actual power received at the base station must be made. However, measuring actual power levels using power meters or automatic gain control calibration circuits does not provide the required level of accuracy at a reasonable cost.

In a standard CDMA wireless system, two power control mechanisms control the power at which the remote unit transmits on the reverse link: open loop power control and closed loop power control. As a remote unit moves away from a base station, the forward link and reverse link path loss generally increases. An increase in path loss on the forward link is typically associated with a decrease in the power received from the base station. As the forward link power decreases, typically the reverse link path loss is also increasing and a corresponding increase in the remote unit transmit power is required to overcome the increased path loss. The open loop power control operates to provide such an increase. In a typical embodiment, a detector or automatic gain control circuit determines the power level of the forward link and adjusts the reverse link transmit power up and down in inverse proportion to changes in the forward link power received.

However, as noted above, the reverse link power level which is transmitted by the remote unit is a function of the interference received at the base station in the reverse link channel as well as the path loss. Therefore, the closed loop power control operates to further adjust the remote unit transmit power in view of the interference power received at the base station. For example, in one embodiment, the base station determines the signal quality at which the reverse link signal is received at the base station and an increase in the interference level causes a decrease in the signal quality unless the remote unit increases the power level at which it is transmitting the reverse link signal. The base station forwards a series of power control commands to the remote unit in order to achieve the desired signal quality. The remote unit accumulates the power control commands and generates a transmit gain adjustment value which adjusts the transmit power of the remote unit above or below the value determined by the open loop power control. Because the transmit gain adjustment value is a function of the power control commands which are in turn a function of the interference received at the base station, the transmit gain adjustment value accurately reflects the level of loading at the base station. It is upon this general principle that the invention operates to overcome the difficulties encountered with the prior art.

Note that the transmit gain adjustment value is a relative measurement, e.g. how much should this particular remote unit change its open loop estimation of the proper reverse link transmit level in order to produce the desired signal quality at the base station. Therefore, according to the invention, it is not necessary to determine the absolute value of any power level in order to determine the loading of the system, thereby, avoiding the expense and imprecision associated with making an absolute power measurement.

According to the invention, a period of silence is observed by the remote units operating in the system. During the period of silence, a single remote unit in the coverage area of the base station transmits a signal to the base station. This remote unit signal is subjected to little or no interference generated by the remote units currently operating in proximity to the base station. The base station sends power control commands to the remote unit, according to normal power control operation. The accumulated transmit gain adjustment value is determined and recorded. At the end of the period of silence, normal operation is resumed. The remote unit continues to transmit a signal to the base station. The remote unit signal is now subjected to the interference generated by the remote units currently operating in proximity to the base station. Thus, the power control commands forwarded from the base station to the remote unit reflect the increased interference level and typically command an increase in the transmit power delivered by the remote unit. As the system operating point changes in response to the altered operating conditions, the accumulated transmit gain adjustment value is determined. A relationship between the transmit gain adjustment value during the period of silence and the transmit gain adjustment value during normal operation effectively provides an indication of system loading according to Equation 3.

$$X = \frac{TGA(t) - TGA(0)}{TGA(t)} \qquad (3)$$

where:
X is the current reverse link loading;
TGA(0) is the accumulated transmit gain adjustment value during the period of silence; and TGA(t) is the current accumulated transmit gain adjustment value.

Figure 2:
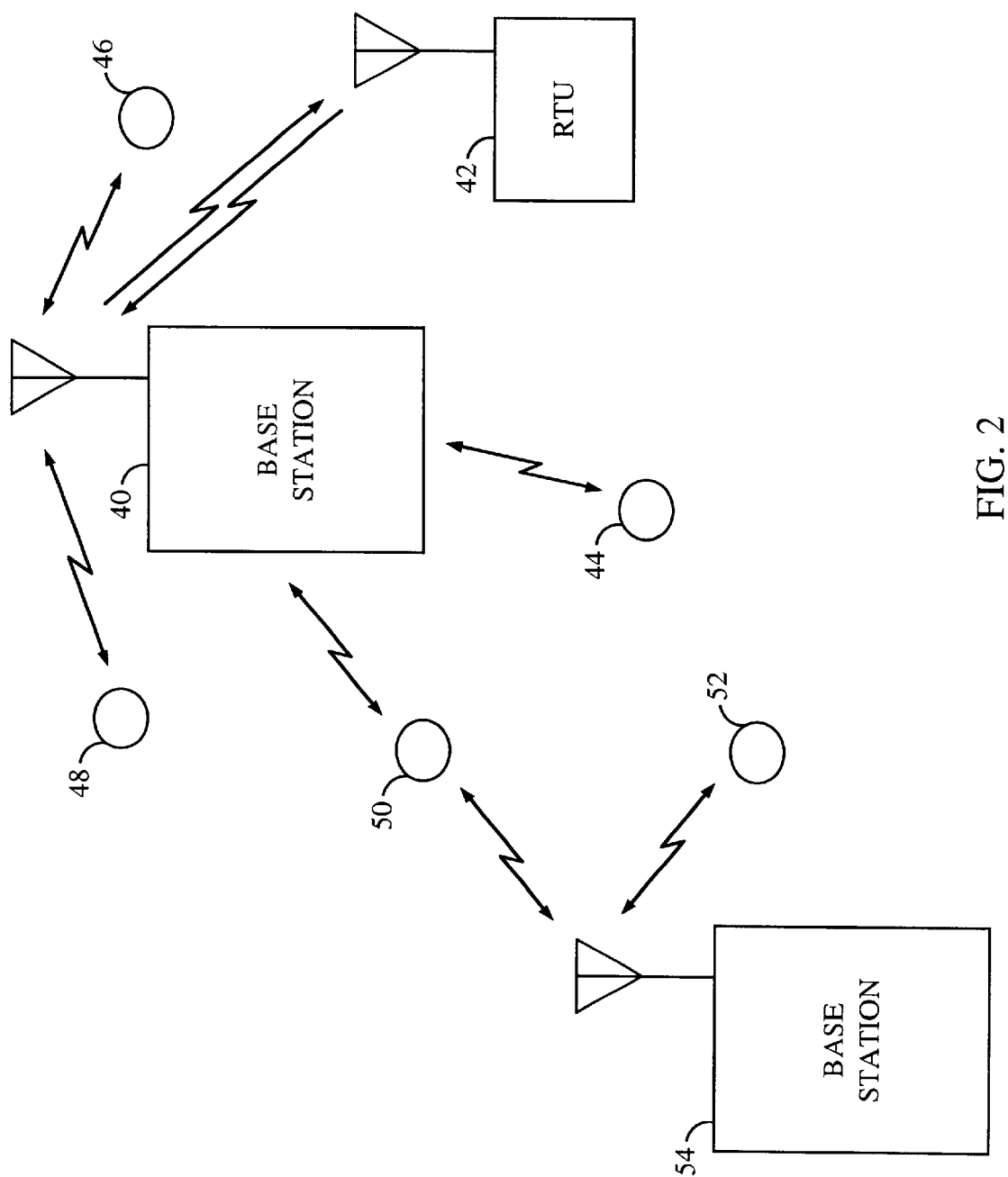
FIG. 2 is a block diagram showing one environment in which the invention may be embodied.

Referring to FIG. 2, in particular, one environment in which the invention may be embodied is detailed. A base station 40 provides bi-directional communications to a plurality of remote units. For example, in FIG. 2, the base station 40 provides two-way communications to remote units 44, 46 and 48. In addition, the base station 40 provides bidirectional communication to a remote unit 50 which is in soft handoff between base station 40 and a base station 54. The base station 54 provides bidirectional communications to a remote unit 52. In actual operating systems, the number of remote units supported by a base station is typically greater than that shown in FIG. 2. Each of these remote units contributes to the interference level at the base station 40 and, thus, affects the current level of loading at the base station 40.

In addition to the standard remote units, the base station 40 establishes a bi-directional communications link with a remote test unit 42. In one embodiment, as explained more fully below, the remote test unit 42 is associated with the base station and used for a variety of diagnostic, calibration and system test functions. In one such embodiment, the remote test unit 42 is co-located with the base station 40. In another embodiment, the remote test unit 42 is housed within a common structure with the base station 40. In yet another embodiment, the remote test unit is mounted externally from the base station 40. For example, such an embodiment might be used in conjunction with a portable base station where the base station size is critical. In another embodiment, the remote test unit 42 is an actual operating remote unit which is permanently or temporarily assigned to operate as a test unit during the period of silence. In such a case, it is advantageous to select a fixed location remote unit (such as a wireless local loop remote unit) so that the remote unit is not in motion during the period of silence. In any case, it is advantageous if the remote unit is located in close proximity to the base station relative to other base stations in the system so that the remote test unit does not provide a substantial source of interference to adjacent base stations performing similar calibrations.

Figure 3:
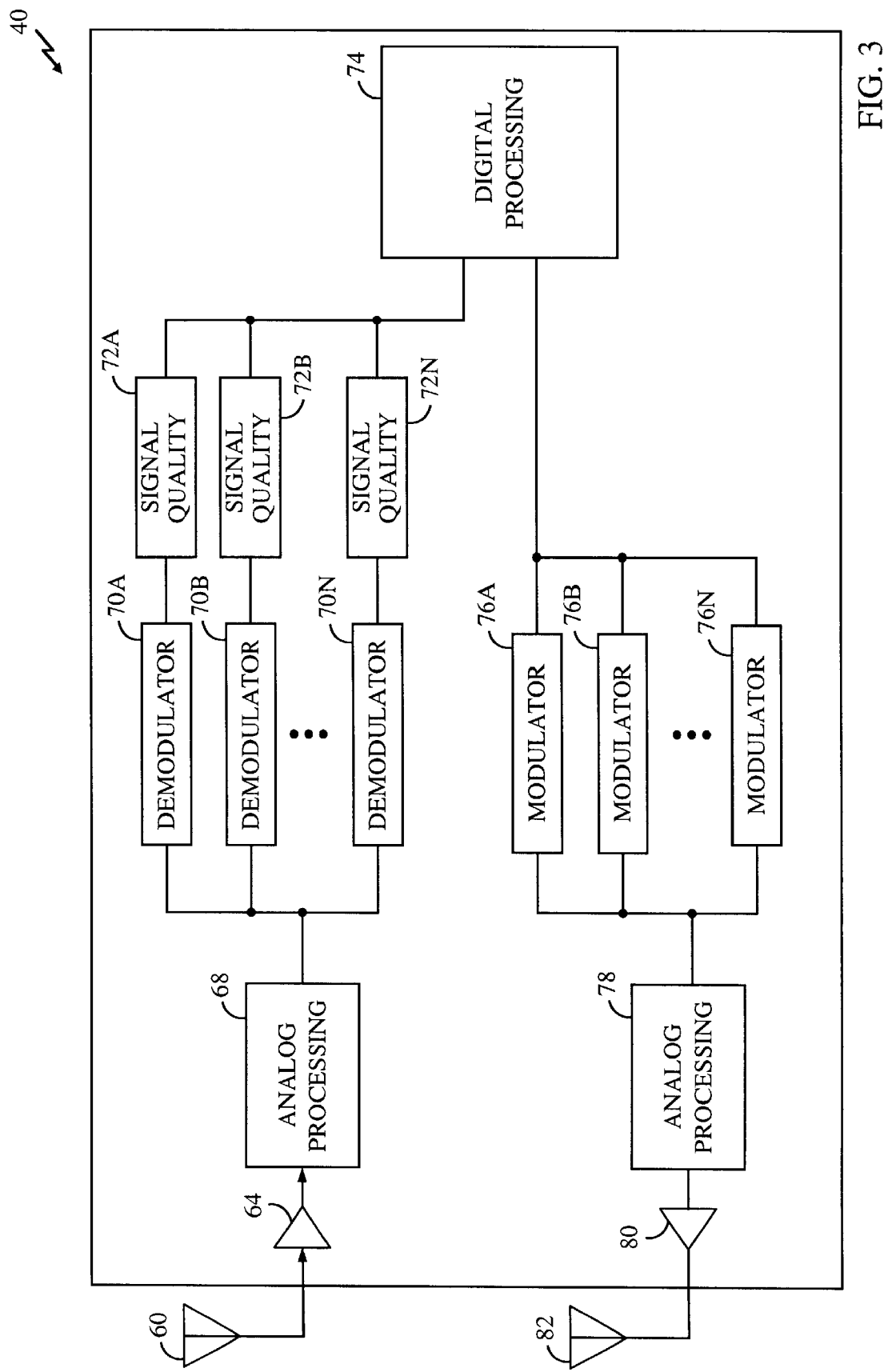
FIG. 3 is a block diagram showing one embodiment of a base station configured for use in connection with the invention.

FIG. 3 is a block diagram showing one embodiment of the base station 40. A receive antenna 60 receives reverse link signals from the remote units operating within the coverage area of the base station 40, interference from remote units operating in the coverage area of adjacent base stations as well as interference from other sources. The signal energy received through the antenna 60 is coupled to an amplifier 64 which in turn is coupled to an analog processing block 68. The base station 40 comprises a set of demodulators 70A–70N. Each of the demodulators 70A–70N is assigned to one remote unit operating within the coverage area of the base station 40. The combined signals are output from the demodulator 70A–70N to a corresponding signal quality block 72A–72N. The signal quality blocks 72A–72N determine the signal quality of the incoming signal. For example, the signal quality blocks 72A–72N determine the signal-to-noise ratio at which the remote unit signal is received. A variety of components can be used to implement the signal quality block 72A–72N according to well known techniques.

In addition to interference generated by the remote units, noise is introduced by the analog circuitry such as the amplifier 64 and the analog processing block 68. The noise contributed by such elements as the amplifier 64 and the analog processing block 68 is a function of the temperature at which the base station operates as well as the aging of the system and, thus, varies as a function of time.

The quality level indications produced by the signal quality blocks 72A–72N are coupled to a digital processing block 74. The digital processing block 74 compares each quality level indication to a desired threshold and determines whether the corresponding remote unit should increase or decrease the power level at which it is transmitting. The digital processing block 74 generates a power control command corresponding to each remote unit and forwards the commands to a corresponding a set of modulators 76A–76N. The modulators 76A–76N modulate the data for transmission over the wireless link. The output of the modulators 76A–76N is coupled to an analog processing block 78 which provides filtering and other functions. The output of the analog processing block 78 is coupled to an amplifier 80. The output of the amplifier 80 is radiated into the coverage area of the base station 40 by a transmit antenna 82.

Figure 4:
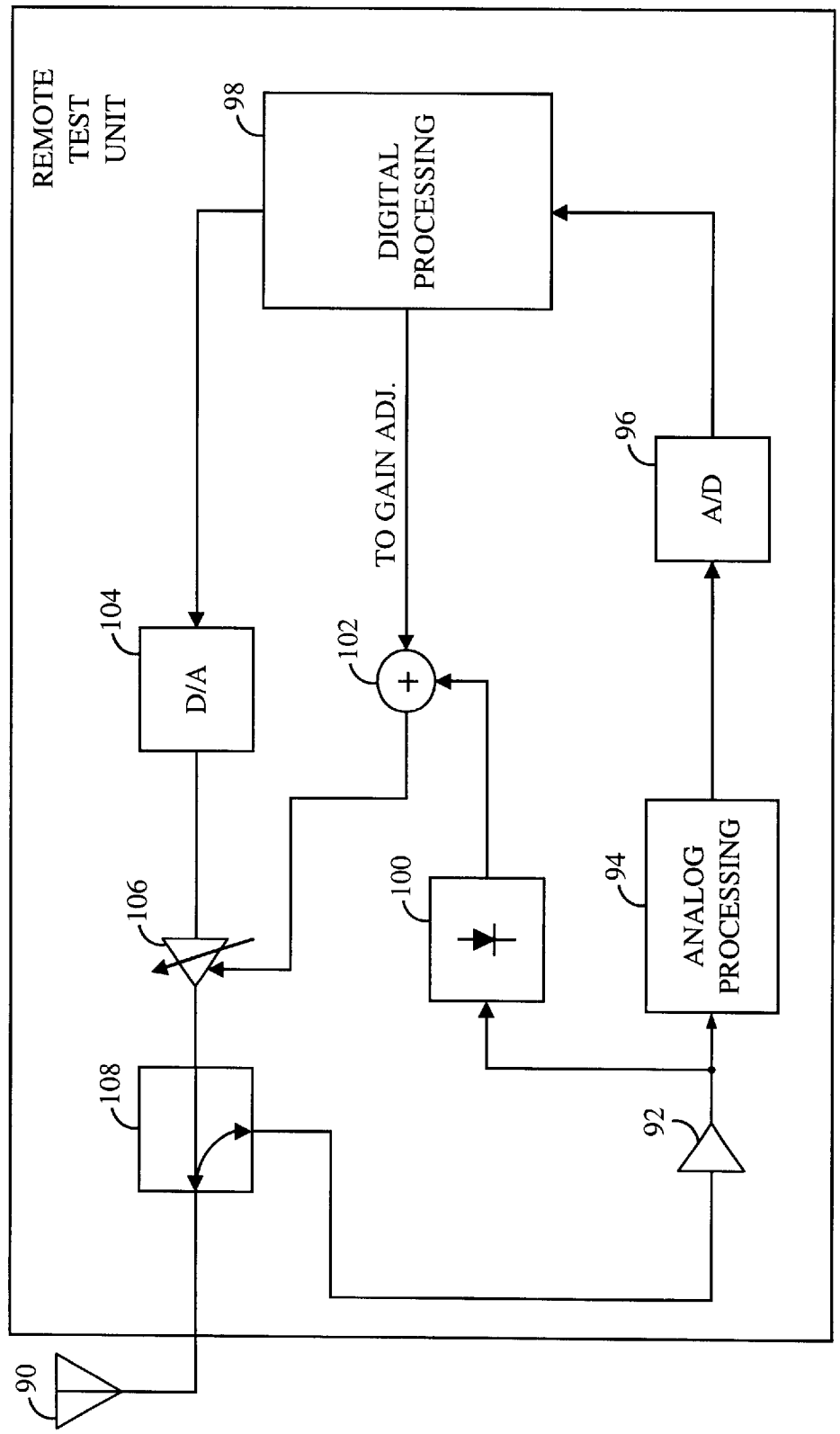
FIG. 4 is a block diagram of a remote test unit.

FIG. 4 is a block diagram of a remote test unit 42. As noted above, in one embodiment, the remote test unit 42 is a dedicated test unit and can comprise either additional functionality or reduced functionality in comparison with the standard remote units. The blocks shown in FIG. 4 correspond to blocks which are present in a standard remote unit and, thus, the block diagram shown in FIG. 4 may be assumed to be a relevant portion of either a standard remote unit or a remote test unit.

An antenna 90 receives the forward link signal as well as interference. The antenna 90 is coupled to a signal diplexer 108 or other device which couples the transmit and receive paths to the antenna 90 while providing sufficient isolation between the transmit and receive paths. The receive path output of the diplexer 108 is coupled to a low noise amplifier 92. The low noise amplifier 92 provides RF gain with a controlled noise floor. The output of the low noise amplifier 92 is coupled to an analog processing block 94 which performs automatic gain control, filtering and other functions. The output of the analog processing block 94 is coupled to an analog-to-digital converter 96. The analog-to-digital converter 96 produces digital data bits for a digital processing block 98.

In addition to other functions, the digital processing block 98 extracts the power control commands received from the base station. The digital processing block 98 accumulates or integrates these commands to produce a transmit gain adjustment value. A variety of components can be used to implement the digital processing block 98 according to well known techniques. For example, the digital processing block 98 can be implemented within an application specific integrated circuit according to well known digital circuit design techniques.

The output of the low noise amplifier 92 is also coupled to a detector block 100. The detector block 100 determines the total power level received by the remote unit. Note that the output of the detector 100 reflects the total power received at the remote unit 42 within the band of interest regardless of the relative amplitude of the reverse link signal intended for the remote unit 42. The open loop power control path comprising the detector 100 adjusts the transmit power based upon the reverse link power detected. The output of the detector 100 is coupled to a summer 102 which also receives the transmit gain adjustment value. The summer 102 sums its two inputs to produce the power level adjustment signal, which determines the output power level.

In one embodiment, the digital-processing block 98 generates a test signal, pilot signal or other known signal which is coupled to a digital-to-analog converter 104. The output of the digital-to-analog converter is coupled to the variable gain amplifier 106. The gain of the variable gain amplifier 106 is determined by the output of the summer 102. The output of the variable gain amplifier block 106 is coupled to the transmit path input of the diplexer 108. The transmit path output of the diplexer 108 is coupled to the antenna 90 and transmitted to the base station 40.

In one embodiment, the remote test unit is calibrated to operate at a fixed location at which the added dynamic range of the open loop power control mechanism is not necessary. In such a case, the open loop power control can be either disabled or eliminated from the design and the closed loop power control is the sole source of power control.

Figure 5:
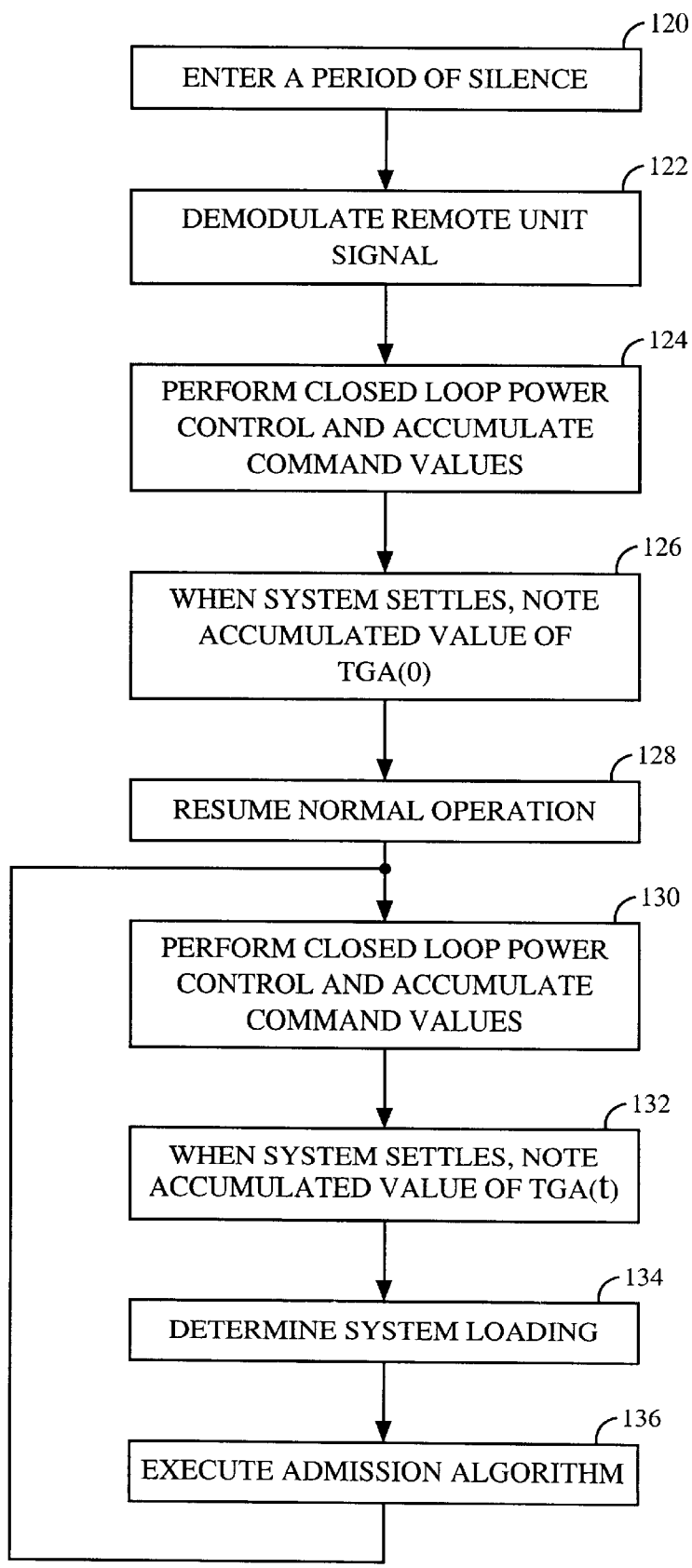
FIG. 5 is a flowchart illustrating the process of accomplishing load estimation in accordance with one embodiment of the invention.

FIG. 5 is a flowchart showing load estimation in accordance with the invention. Flow begins in block 120 in which the system enters a period of silence. In one embodiment, the period of silence is observed by a group of base stations simultaneously. In this way, the interference introduced by remote units operating in neighboring base stations is also greatly decreased during the period of silence. In one embodiment, the period of silence is entered periodically and automatically by the remote units and the base stations. Alternatively, the period of silence is instigated by a system controller which commands the base stations to enter the period of silence. In turn, the base stations forward a period of silence command to the remote units. In one embodiment, such a command is transferred to the remote units on an overhead channel which is monitored by the remote units even when the remote units have not established a link with the base station in order to inhibit access attempts during the period of silence. In yet another embodiment, the message transmitted by the base station identifies a particular operating remote unit to act as the remote test unit for the period of silence. Alternatively, the remote test unit is a dedicated test unit. The remote test unit transmits during the period of silence. In one embodiment, the remote test unit transmits a pilot or dummy signal or other known sequence to the base station. In another embodiment, the remote test unit transmits user data.

In block 122, the base station demodulates the remote test unit signal. The base station and remote test unit perform closed loop power control to set the signal quality level of the received signal at the base station approximately equal to the desired signal quality value. In general, as a result of the closed loop power control, the base station sends the remote unit a series of turn-down commands because of the reduced interference during the period of silence. In one embodiment, the base station accumulates the power control commands to generate a surrogate transmit gain adjustment value equivalent to the one created in the remote test unit in a similar manner as the remote unit generates the actual transmit gain adjustment value. In another embodiment, the remote unit accumulates the actual transmit gain adjustment value and forwards it to the base station.

The closed loop power control operates according to a loop time constant which must be considered when determining the length of the period of silence. The power control loop must be given sufficient time to "settle" during the period of silence. In block 126, after the closed loop power control as entered steady state operation, the accumulated transmit gain adjustment value is recorded as TGA(0). The required duration of the period of silence depends upon system operating parameters including the time constant of the power control loop. The duration over which the reverse link is silent can be on the order of 25–50 milliseconds in a system which operates according to IS-95A. In one embodiment, the remote unit is transmitting digital data and such an interruption of service is not noticeable so long as it is executed reasonably infrequently. In addition, such a short break in the reverse link can be tolerated in many types of voice systems. In yet another embodiment, only the reverse link observes the period of silence and the forward link continues to operate. In this way, the open loop power control is less affected by the period of silence. In addition, such operation allows a continued flow of user data over the forward link during the period of silence The frequency with which the period of silence is observed can depend on several factors. If the system loading is well below the capacity limit, a precise determination of loading is less critical. As the loading of the system approaches the capacity limit, it is important to have an accurate understanding of the actual loading. Thus, the frequency with which the period of silence is observed can be a function of the loading of the system. As noted above, the system noise figure is a function of the temperature at which the system is operating. In one embodiment, the frequency with which the period of the silence is observed is a function of the current temperature gradient. In another embodiment, the period of silence is observed in a periodic fashion independent of other parameters.

Referring again to FIG. 5, in block 128, the system resumes normal operation. In general, the interference perceived at the base station increases due to the resumption of reverse link communication. In block 130, the base station and remote unit perform closed loop power control to adjust for the increased interference levels. In general, the base station sends the remote unit a series of turn-up commands. These commands are accumulated at the base station or, alternatively, accumulated by the remote unit and forwarded to the base station.

When the closed loop power control settles, the system moves to block 132 wherein the accumulated current transmit gain adjust value, TGA(t), is determined. In block 134, the system loading is determined based upon TGA(0) and TGA(t). For example, the system loading can be determined as shown in Equation 3. As shown in block 136, in one embodiment, the system loading is used to execute an admission algorithm. In one embodiment, the operations of blocks 130, 132, 134 and 136 are repeated multiple times before entering another period of silence. In this way, the current loading of the system can be determined more frequently than the period of silence is observed. Such operation yields accurate results because the current loading of the system can change much more rapidly than the no-load conditions.

Figure 6:
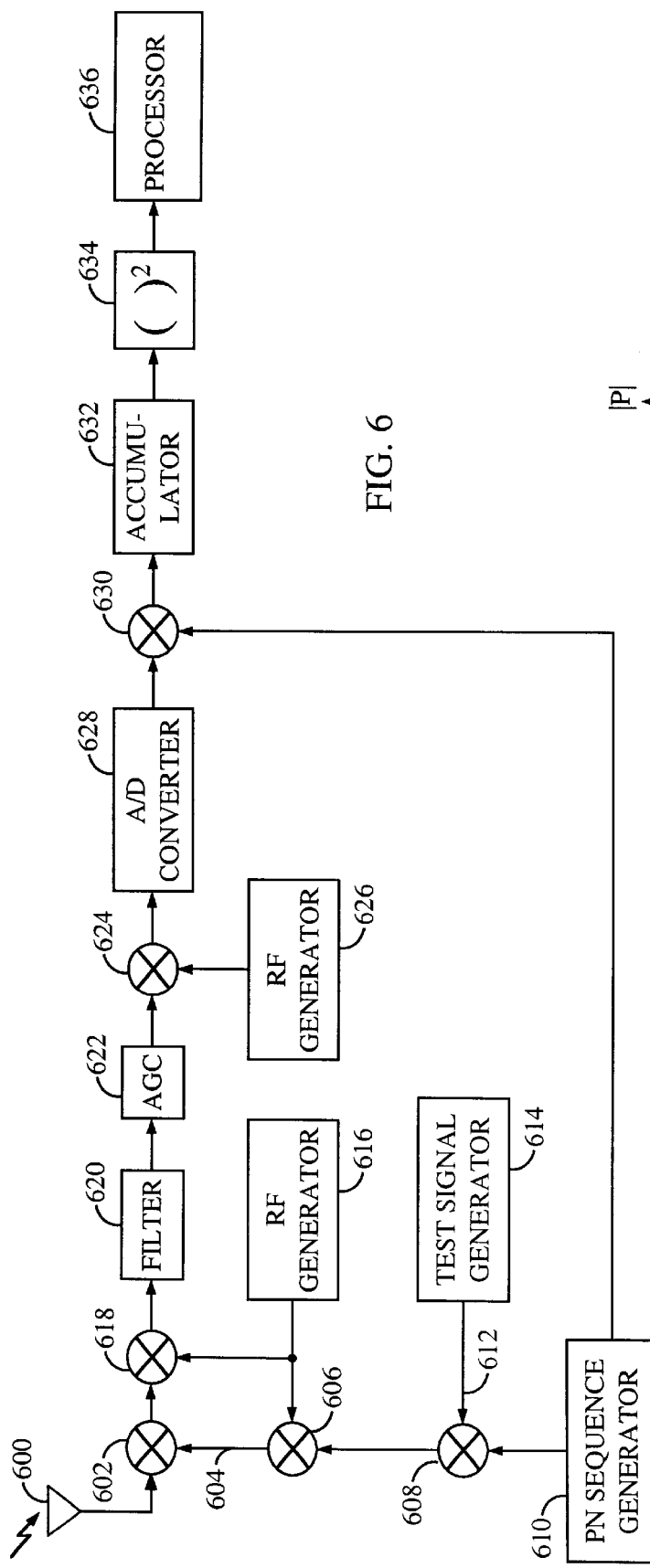
FIG. 6 is a block diagram showing a base station estimate reverse link loading in accordance with a second embodiment of the present invention.

The second embodiment of the invention is illustrated in FIG. 6. One of ordinary skill in the art will readily recognize that the block diagram contains only the circuitry necessary for understanding the present invention. The reverse link signals arrive at the antenna 600, and are provided to a summer 602 where a RF test signal 604 is injected to the base station receiver.

The RF test signal 604 is derived from test signal generator 614 producing low power test signal 612. The test signal 612 may be any signal that has a power content low enough as not to affect thermal noise performance of the system. In the preferred embodiment, the test signal has constant amplitude. The test signal 612 is then provided to a spreader 608 where it is spread by a PN sequence generated by a PN sequence generator 610. In the preferred embodiment, the PN sequence is derived from the base station's time and frequency module, and has a chip rate of 614.4 kHz. The PN spread test signal is provided to a mixer 606 where it is up-converted by a signal provided by a first RF generator 616.

Signal from the summer 602 is provided to a mixer 618 where it is down-converted in accordance with the signal provided by a first RF generator 616. The down-converted signal is provided to a bandpass filter 620.

Figure 7:
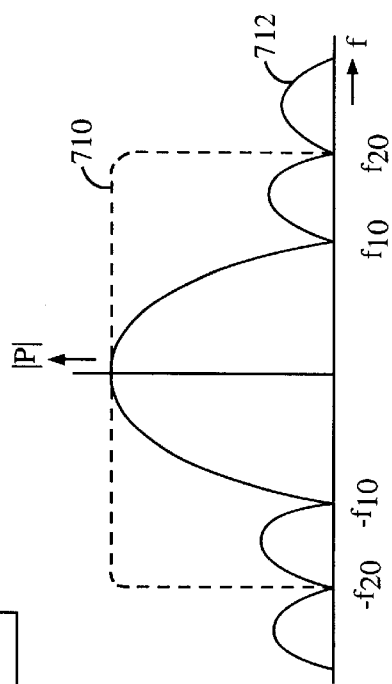
FIG. 7 is a plot showing an exemplary relationship between spectral characteristics of a bandpass filter, and spectral characteristics of a low power test signal employed in estimating reverse link loading in accordance with the second embodiment of the present invention.

FIG. 7 depicts the relationship between spectral characteristics of filter 620 labeled 710, and spectral characteristics of the PN spread test signal 612. Proper relationship will assure that most of the spectral content of the PN spread test signal 612 lies within the bandpass of filter 620. In the preferred embodiment the frequency $f_{10}$ is 614.4 kHz, and $f_{20}$ is 1.2288 MHz, such that the primary and secondary spectral lobes of the PN spread test signal lie within the bandpass of filter 620.

Referring back to FIG. 6, the filtered signal is provided to an automatic gain circuit (AGC) 622. AGC 622 regulates the filtered signal to pre-determined output power. The regulated signal is provided to a mixer 624, where it is down-converted to a baseband in accordance with a signal provided by a second RF generator 626. The baseband signal is provided to an analog-to-digital converter (ADC), which provides a digital signal to a despreader 630. Despreader 630 uses the PN sequence provided by a PN sequence generator 610 to despread the baseband signal, thus recovering a replica of the test signal 612, an amplitude of which is scaled by operation of the AGC 622. The despread signal is provided to an accumulator 632.

Accumulator 632 accumulates samples of the despread signal for a predetermined time, thus eliminating any noise from the despread signal. One ordinarily skilled in the art will readily recognize that processing gain of accumulator 632 can be changed by the period of accumulation. The output of the accumulator 632 is provided to a squaring element 634, therefore, the output of the squaring element 634 contains information about power of the replica of the low power test signal 612. The output of the squaring element 634 is provided to a processor 636, which performs any additional processing. In preferred embodiment, the processor 636 gathers additional information about a noise power at the output of the AGC 622, and frequency of the PN sequence, and evaluates energy-per-chip to noise ratio $$\left(\frac{E_C}{N_0}\right)$$

of the replica of the low power test signal 612. The processor 636 then uses the $$\frac{E_C}{N_0}$$

to evaluate equation (2), and execute an admission algorithm.

Figure 8:
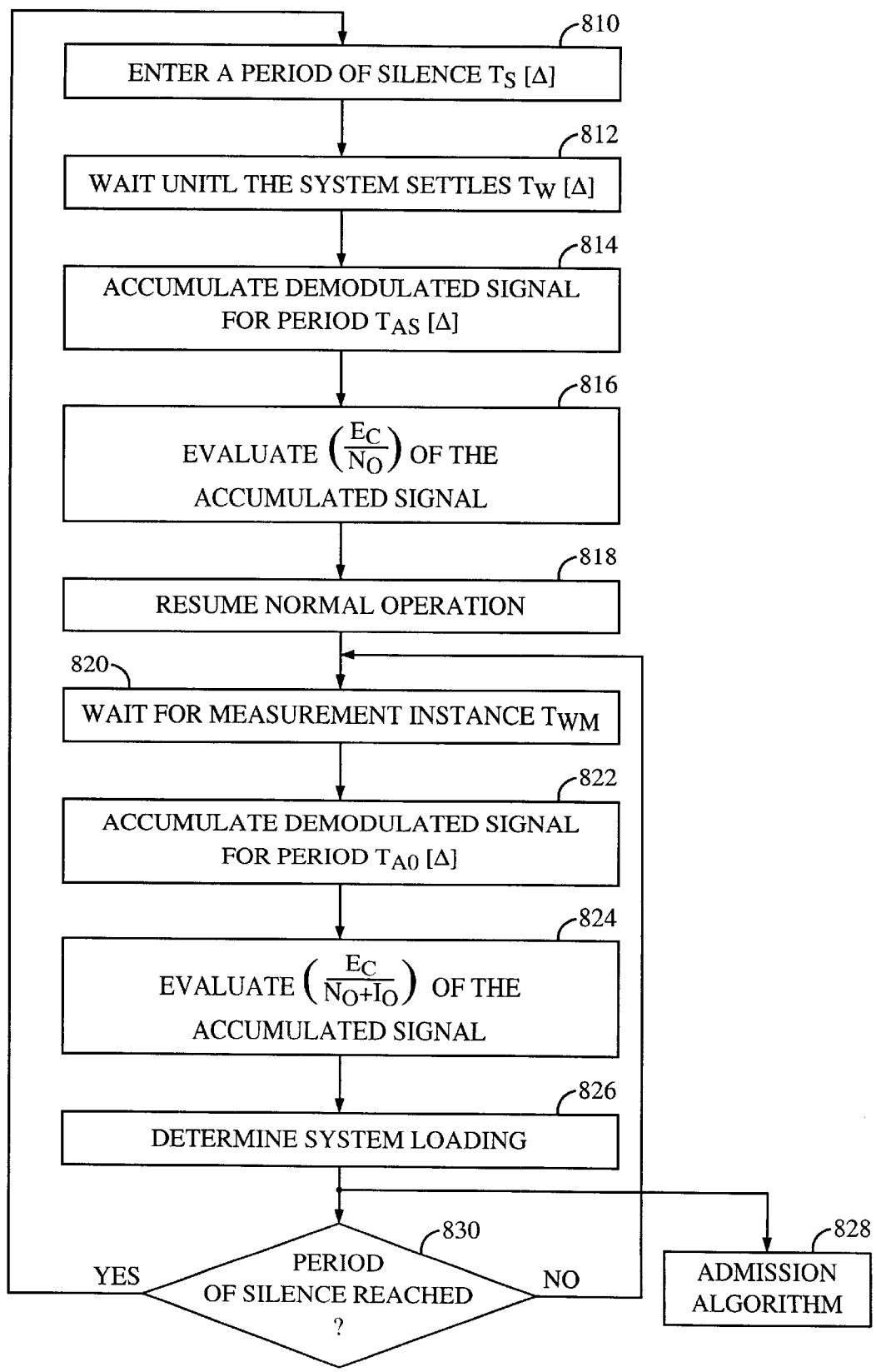
FIG. 8 is a flowchart illustrating the process of performing load estimation in accordance with the second embodiment of the invention.

FIG. 8 is a flowchart illustrating the method of performing load estimation in accordance with the second embodiment of the invention. In block 810, all the remote units in the system enter a period of silence for time interval $T_S$. In one embodiment, a system controller commands the base stations to forward a period of silence command to the remote units. Alternatively, the period of silence command is forwarded periodically. In one embodiment, the command is transferred to the remote units on an overhead channel which is monitored by the remote units even when the remote units have not established a link with the base station in order to inhibit access attempts during the period of silence.

In block 812, the apparatus for estimating the reverse link loading enters a settling period $T_W$. This period is dependent on time constants inherently present in the base station, e.g., a power control loop time constant, AGC time constant, etc.

In block 814, the apparatus for estimating the reverse link loading accumulates demodulated signal for a period $T_{AS}$. Because the demodulated signal is a replica of the low power test signal 612 in FIG. 6, high processing gain is desirable to increase the power of the test signal 612 to levels allowing accurate measurement. For example, if the $$\frac{E_C}{N_0}$$

of the replica of the test signal 612 is equal to −30 dB in the preferred embodiment, accumulation for $T_{AS}$=1,000 chips will result in processing gain=1,000 (30 db). Consequently, the $$\frac{E_C}{N_0}$$

is raised to 0 dB. As discussed, the length of period $T_{AS}$ affects processing gain of the accumulator 632 from FIG. 6. The low power test signal 612, derived from the base station time and frequency module 614 in FIG. 6 is drift free, and, consequently, long accumulation times are possible. The accumulation period $T_{AS}$ is limited by the following equation:

$$T_S \geq T_W + T_{AS} \qquad (4)$$

where $T_S$ and $T_W$ are periods as defined.

The required duration of the period of silence, $T_S$, depends upon system operating parameters including the time constant of the power control loop. The duration over which the remote units are silent can be on the order of 25–55 milliseconds in a system, which operates according to IS-95A. Such a short break in the reverse link can be tolerated as long as it occurs infrequently enough not to negatively affect data throughput. This is one of the factors that need to be observed when considering the frequency of the periods of silence. If the system loading is well below the capacity limit, a precise determination of loading is less critical. As the loading of the system approaches the capacity limit, it is important to have an accurate estimate of the actual loading. Thus, the frequency with which the period of silence is observed can be a function of the loading of the system. As noted above, the system noise figure is a function of the temperature at which the system is operating. In one embodiment, the frequency with which the period of the silence is observed is a function of the current temperature gradient. In another embodiment, the period of silence is observed in a periodic fashion independent of other parameters.

In block 816, the apparatus for estimating the reverse link loading calculates $$\left(\frac{E_C}{N_0}\right)$$

of the signal accumulated in block 814. Because the accumulated signal comprises a replica of the test signal 612 in FIG. 6 as affected by thermal noise, $$\left(\frac{E_C}{N_0}\right)$$

reflects noise floor power $P_n$ of the base station. One ordinarily skilled in the art will readily recognize that calculation of $$\left(\frac{E_C}{N_0}\right)$$

is optional. In a different embodiment, block 816, accepts the signal accumulated in block 814, and calculates $E_C$ as the measure of the noise floor power $P_n$ of the base station.

In block 818, the remote units in the system resume normal operation.

In optional block 820, the inventive apparatus enters a waiting period $T_{WM}$, before it starts to accumulate demodulated signal in block 822. One ordinarily skilled in the art will readily recognize that inclusion of this block is entirely dependent on a load measurement strategy, which is by large a design choice. Thus, in one embodiment there may be no waiting period, the system starting to accumulate demodulated signal immediately after previous accumulation has finished. In another embodiment, the waiting period can be a function of the loading of the system. In yet another embodiment, the waiting period can be entered with fixed frequency.

In block 824, the inventive apparatus calculates $$\left(\frac{E_C}{N_0 + I_0}\right)$$

of the signal accumulated in block 822. Resumption of operation by the remote units, which happened previously, generally results in increased signal at the base station. This signal represents interference, an additional noise $I_0$, with respect to the low power test signal 612 in FIG. 6. Consequently, $$\left(\frac{E_C}{N_0 + I_0}\right)$$

reflects actual power of loaded base station $P_a$. As in block 816, a different measure of the actual power of loaded base station $P_a$ can be calculated.

In block 826, the system uses $$\left(\frac{E_C}{N_0}\right)$$

computed in block 816, and $$\left(\frac{E_C}{N_0 + I_0}\right)$$

computed in block 824 to determine base station loading, which is then used by an admission algorithm, represented by block 828. The admission algorithm of block 828 contains the criteria, by which remote stations are permitted to communicate with the base stations.

In block 830, the base station makes a decision whether to continue measuring load, blocks 820 to 826, or whether to recalibrate reference for the noise floor, blocks 810 to 818.

Figure 9:
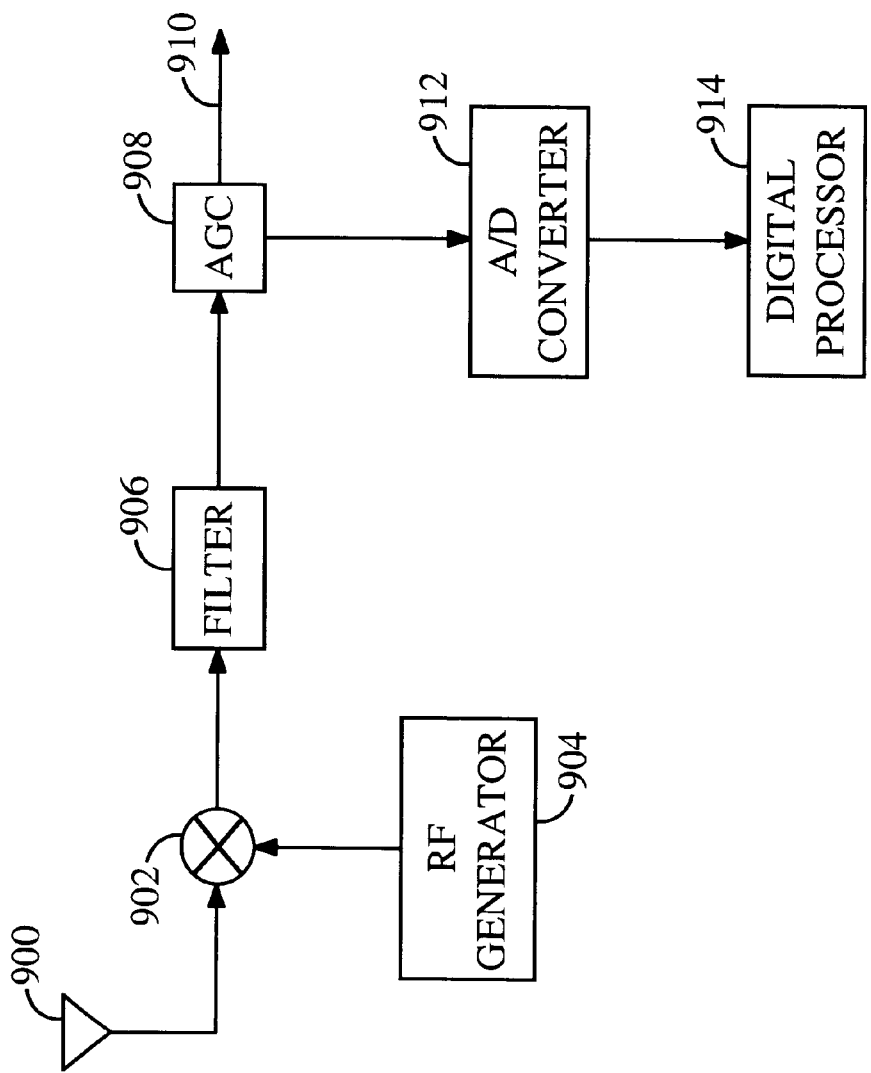
FIG. 9 is a block diagram showing yet another embodiment of a base station configured to estimate reverse link loading in accordance with a third embodiment of the present invention.

The third embodiment of the invention is depicted in FIG. 9. One of ordinary skill in the art will readily recognize that the block diagram contains only the circuitry necessary for understanding the present invention. The reverse link signals arrive at an antenna 900, and are provided to a mixer 902, where the reverse link signals are down-converted in accordance with signal provided by a RF generator 904. The down-converted signal is then provided to a filter 906, and then to an automatic gain control (AGC) 908. The output signal 910 from the AGC 908 is further processed for its information content. The gain setting, or other parameter reflecting gain setting, of the AGC 908 is provided to an analog-to-digital converter (ADC) 912. The digitized samples from the ADC 912 are provided to digital processor 914 for further processing.

Figure 10:
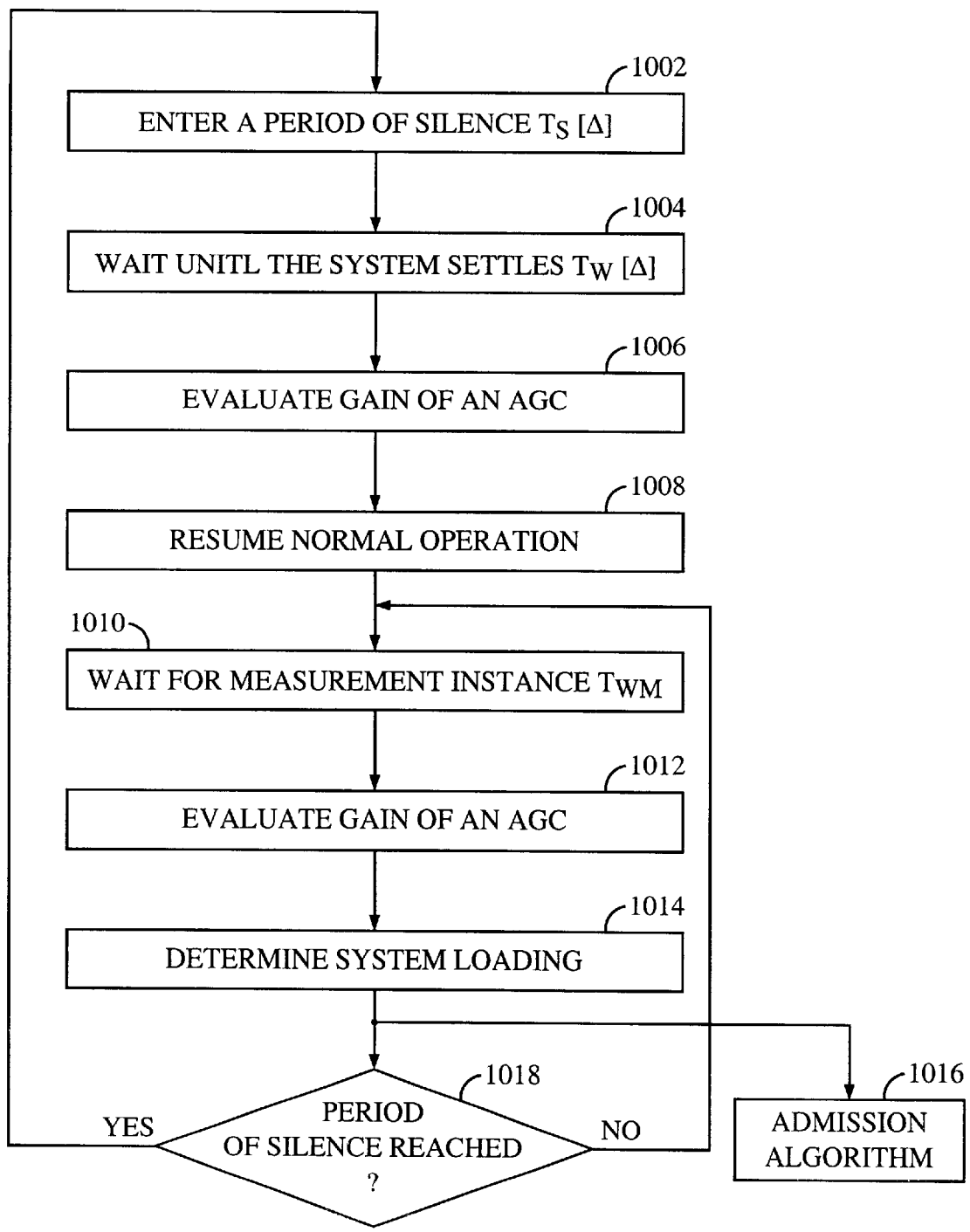
FIG. 10 is a flowchart illustrating the process of accomplishing load estimation in accordance with the third embodiment of the present invention.

FIG. 10 is a flowchart showing load estimation in accordance with the third embodiment of the invention. In block 1002, all the remote units in the system enter a period of silence for $T_S$. In one embodiment, a system controller commands the base stations to forward a period of silence command to the remote units. Alternatively, the period of silence command is forwarded periodically. In one embodiment, the command is transferred to the remote units on an overhead channel, which is monitored by the remote units even when the remote units have not established a link with the base station in order to inhibit access attempts during the period of silence.

In block 1004, the inventive apparatus enters a settling period $T_W$. This period is dependent on time constants inherently present in the base station, e.g., a power control loop time constant, AGC time constant, etc.

In block 1006, the digital processor 914 from FIG. 9 evaluates gain setting of the AGC 908 from FIG. 9. One ordinarily skilled in the art will readily recognize that the evaluation strategy is dependent on required accuracy, and is thus by large a design choice. Thus, in one embodiment, the processor can average samples over part or all of measurement period $T_M$.

$$T_M = T_S - T_W \tag{5}$$

In another embodiment, different filtering strategies may be employed. Because the input to the AGC 908 from FIG. 9 is a signal containing no signal energy from remote stations, the gain setting determined in block 1006 corresponds to noise floor power $P_n$ of the base station.

In block 1008 the remote units in the system resume normal operation.

In optional block 1010 the inventive apparatus enters a waiting period $T_{WM}$, before it starts to evaluate gain setting of the AGC 908 from FIG. 9 in block 1012. One ordinarily skilled in the art will readily recognize that inclusion of this block is entirely dependent on a load measurement strategy, which is by large a design choice. Thus, in one embodiment there is no waiting period, the system starting to evaluate gain setting immediately after previous evaluation has been finished. In another embodiment, the waiting period is a function of the loading of the system. In yet another embodiment, the waiting period is entered periodically. Resumption of operation by the remote units, which happened previously, would generally result in increased signal at the base station. This signal represents actual power perceived by the base station. Consequently, the gain setting evaluated in this block reflects actual power of loaded base station $P_a$.

In block 1014, the system uses gain setting evaluated in block 1006, and gain setting evaluated in block 1012 to determine base station loading, which is then used by an admission algorithm, represented by block 1016.

In block 1018, the base station makes a decision whether to continue measuring load, blocks 1010 to 1012, or whether to recalibrate reference for the noise floor, blocks 1002 to 1006.

In one embodiment, the value of loading is used to implement an admission control algorithm, which regulates the number of system users. A variety of admission control algorithms can be used in conjunction with the invention. For example, all new call originations can be denied if the system loading has exceeded an overload threshold for more than a predetermined amount of time. Alternatively, all new connections including those generated by soft handoff requests are denied if loading exceeds an overload threshold for more than a period of time. In another embodiment, the admissions control algorithm incorporates hysteresis so that once loading has exceeded a predetermined threshold, originations are denied until the loading falls below a second threshold for more than a period of time.

The loading can be calculated as given above and used to control one or more functions of the base station. For example, the loading can be used to influence the signal quality set point at the base station. The loading can also be used to influence the operation of the power control mechanism. The loading can also be used in a base station "breathing mechanism" such as the one disclosed in U.S. Pat. No. 5,548,812 entitled "METHOD AND APPARATUS FOR BALANCING THE FORWARD LINK HANDOFF BOUNDARY TO THE REVERSE LINK HANDOFF BOUNDARY IN A CELLULAR COMMUNICATION SYSTEM." In addition, loading can also be used in a data rate control algorithm, which is used to limit the rate at which variable data rate remote units transmit data.

To the skilled artesian, a myriad of alternative embodiments of the invention just described will be readily apparent upon examination of the above text and corresponding drawings including the simple reordering of steps or blocks. For example, the current transmit gain adjustment value can be determined before the no-load value is determined. In one embodiment, only a subset of base stations observing the period of silence perform load determination, thus reducing the mutual interference generated by the remote test units. The power detection measurement made in the remote unit can occur at radio frequency, intermediate frequency or at baseband. Even though the system was explained with reference to a code division multiple access cellular system comprising a plurality of base stations, the invention can be implemented in a variety of systems where a plurality of users compete for access to a finite resource. In yet another embodiment, the base station sums the number of turn-up commands and turn-down commands which are generated upon entering the period of silence and which are generated upon resuming normal operation and determines the loading without determining the actual transmit gain adjustment value. Although the invention was described with reference to a system which sends either turn-up or turn-down commands, the principles can be directly applied to a system in which the amount by which the remote unit turns-up or turns-down its transmit power is specified in the command.

The invention and the processes which comprise the invention can be implemented in a variety of media including application specific integrated circuits (ASIC), software running on a digital signal processor, a programmed storage device or other such media.

The invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes, which come within the meaning and range of equivalency of the claims, are to be embraced within their scope.

What is claimed is:

1. A method of estimating loading in a wireless communication system, comprising the steps of:
   entering a period of silence during which a designated remote unit continues to transmit;
   performing closed loop power control on a reverse link signal received from said designated remote unit;
   accumulating a first series of power control commands to produce a first transmit gain adjustment value;
   resuming normal operation in which active remote units resume transmission of reverse link signals;
   performing closed loop power control on said reverse link signal received from said designated remote unit;
   accumulating a second series of power control commands to produce a second transmit gain adjustment value; and
   determining a level of loading based upon said first and second transmit gain adjustment values.

2. The method of claim 1, wherein said period of silence occurs simultaneously among a group of base stations.

3. The method of claim 1, wherein said period of silence follows a silence command transmitted by a base station.

4. The method of claim 1, wherein said period of silence occurs periodically.

5. The method of claim 1, wherein said steps of performing closed loop power control comprise the step of transmitting said first and second series of power control commands to said designated remote unit.

6. The method of claim 1, wherein said steps of performing closed loop power control comprise the step of adjusting a transmission power of said reverse link signal by said designated remote unit.

7. The method of claim 1, wherein said steps of performing closed loop power control comprise the step of transmitting said first and second series of power control commands to said designated remote units.

8. The method of claim 1, further comprising the step of using said level of loading in an admission method which admits or denies access to said system.

9. The method of claim 1, further comprising the step of using said level of loading in a data rate determination method which controls a data rate at which remote units access said system.

10. The method of claim 1, wherein said level of loading is proportional to $$\frac{TGA(t) - TGA(0)}{TGA(t)}$$

wherein TGA(0) is equal to said first transmit gain adjustment value and wherein TGA(t) is equal to said second transmit gain adjustment value.

11. The method of claim 1, wherein said steps of accumulating are performed by a base station.

12. The method of claim 1, wherein said steps of accumulating are performed by said designated remote unit.

13. An apparatus for load estimation in a wireless communication system, comprising:
   means for performing closed loop power control on a reverse link signal received from a designated remote unit;
   means for entering a period of silence during which said designated remote unit continues to transmit;
   means for accumulating a first series of power control commands to produce a first transmit gain adjustment value;

means for resuming normal operation in which active remote units resume transmission of reverse link signals;

means for accumulating a second series of power control commands to produce a second transmit gain adjustment value; and means for determining a level of loading based upon said first and second transmit gain adjustment values.

14. The apparatus of claim 13, wherein said period of silence occurs simultaneously among a group of base stations.

15. The apparatus of claim 13, wherein said means for performing closed loop power control comprises means for remotely adjusting a transmission power of said reverse link signal.

16. The apparatus of claim 13, wherein said means for performing closed loop power control comprises means for transmitting said first and second series of power control commands to said designated remote units.

17. The apparatus of claim 13, further comprising means responsive to said level of loading for admitting or denying access to said system.

18. The apparatus of claim 13, further comprising means responsive to said level of loading for controlling a data rate at which remote units access said system.

19. The apparatus of claim 13, wherein said level of loading is proportional to $$\frac{TGA(t) - TGA(0)}{TGA(t)}$$

wherein TGA(0) is equal to said first transmit gain adjustment value and wherein TGA(t) is equal to said second transmit gain adjustment value.

20. The apparatus of claim 13, wherein said means for accumulating are incorporated in a base station.

21. The apparatus of claim 13, wherein said means for accumulating are incorporated in said designated remote unit.

22. A base station, comprising:
a demodulator receiving a remote test unit signal and producing a demodulated signal;
a signal quality determination block receiving said demodulated signal and producing an indication of quality thereof; and
a digital signal processor receiving said indication of quality and determining a power control command for said remote test unit, wherein said digital signal processor accumulates a first series of power control commands corresponding to said remote test unit during a period of silence, accumulates a second series of said power control commands corresponding to said remote test unit during a period of normal operation and determines a level of loading based upon said first and second series of power control commands.

23. A method of estimating loading in a wireless communication system, comprising the steps of:
(a) injecting, at a base station, a test signal prior to an automatic gain control;
(b) entering a period of silence during which all remote units cease transmission;
(c) accumulating, at said base station after said automatic gain control, said test signal to produce a first power value;
(d) resuming normal operation in which active remote units resume transmission;
(e) accumulating, at a base station after said automatic gain control, said test signal to produce a second power value; and
(f) determining a level of loading based upon said first and second power values.

24. The method of claim 23, wherein said period of silence follows a silence command transmitted by a base station.

25. The method of claim 23, wherein said period of silence occurs periodically.

26. The method of claim 23 further comprising a step of:
(a) repeating said steps (e) and (f) several times before resuming said step (b).

27. The method of claim 23, wherein said level of loading is proportional to $$\frac{P_a - P_n}{P_a}$$

wherein $P_n$ is equal to said first power value and wherein $P_a$ is equal to said second power value.

28. The method of claim 23, further comprising a step of:
(a) using said level of loading in an admission method which admits or denies access to said system.

29. The method of claim 23, further comprising a step of using said level of loading in a data rate determination method which controls a data rate at which remote units access said system.

30. An apparatus for load estimation in a wireless communication system, comprising:
(a) means for injecting, at a base station, a test signal prior to an automatic gain control;
(b) means for entering a period of silence during which all remote units cease transmission;
(c) means for accumulating, at said base station after said automatic gain control, said test signal to produce a first power value;
(d) means for resuming normal operation in which active remote units resume transmission;
(e) means for accumulating, at said base station after said automatic gain control, said test signal to produce a second power value; and
(f) means for determining a level of loading based upon said first and second power values.

31. The apparatus of claim 30, wherein said means for entering period of silence act in a response to a silence command transmitted by a base station.

32. The apparatus of claim 30, wherein said means for entering period of silence act periodically.

33. The apparatus of claim 30 further comprising:
(a) means for invoking repeated use of said means (e) and (f) several times before invoking said means (b).

34. The apparatus of claim 30, wherein said level of loading is proportional to $$\frac{P_a - P_n}{P_a}$$

wherein $P_n$ is equal to said first power value and wherein $P_a$ is equal to said second power value.

35. The apparatus of claim 30, further comprising:
(a) means for using said level of loading in an admission method which admits or denies access to said system.

36. The apparatus of claim 30, further comprising:
(a) means for using said level of loading in a data rate determination method which controls a data rate at which remote units access said system.

37. A base station, comprising:
(a) a receiver, configured to receive signals from remote units;

(b) a transmitter, configured to transmit signals to said remote units;

(c) a test signal generator, communicatively coupled to a coupler for injecting a test signal to said receiver prior to an automatic gain control;

(d) a power level determination device, communicatively coupled to said automatic gain control; and (e) a processor, communicatively coupled to said power level determination device and said transmitter, said processor having been configured to:
  (i) provide a signal to said transmitter, said signal indicating a period of silence, and a period of normal operation;
  (ii) accept from said power level determination device a first power level determined during said period of silence;
  (iii) accept from said power level determination device a second power level determined during said period of normal operation; and
  (iv) determine a level of loading loading based upon said first and second power values.

38. A remote station, comprising
(a) a receiver, configured to receive signals from base stations;
(b) a transmitter, configured to transmit signals to said base stations;
(c) a processor communicatively coupled to said receiver and said transmitter, said processor having been configured to:
  (i) determine whether a signal provided by said receiver contain a command to enter a period of silence;
  (ii) instruct said transmitter to cease transmission for said period of silence upon detection of said command; and
  (iii) instruct said transmitter to resume transmission upon expiration of said period of silence.

39. A method of estimating loading in a wireless communication system, comprising the steps of:
(a) entering a period of silence during which all remote units cease transmission;
(b) evaluating, at a base station, a first gain setting of an automatic gain control;
(c) resuming normal operation in which active remote units resume transmission;
(d) evaluating, at said base station, a second gain setting of said automatic gain control; and
(e) determining a level of loading based upon said first and second gain settings.

40. The method of claim 39, wherein said period of silence follows a silence command transmitted by said base station.

41. The method of claim 39, wherein said period of silence occurs periodically.

42. The method of claim 39 further comprising a step of:
(b) repeating said steps (d) and (e) several times before resuming said step (a).

43. The method of claim 23, wherein said level of loading is proportional $$\frac{G_a - G_n}{G_a}$$

wherein $G_n$ is equal to said first gain setting and wherein $G_a$ is equal to said second gain setting.

44. The method of claim 39, further comprising a step of:
(b) using said level of loading in an admission method which admits or denies access to said system.

45. The method of claim 39, further comprising a step of using said level of loading in a data rate determination method which controls a data rate at which remote units access said system.

46. An apparatus for load estimation in a wireless communication system, comprising:
(a) means for entering a period of silence during which all remote units cease transmission;
(b) means for evaluating, at a base station, a first gain setting of an automatic gain control;
(c) means for resuming normal operation in which active remote units resume transmission;
(d) means for evaluating, at said base station, a first gain setting of said automatic gain control; and
(e) means for determining a level of loading based upon said first and second gain settings.

47. The apparatus of claim 46, wherein said means for entering period of silence act in a response to a silence command transmitted by a base station.

48. The apparatus of claim 46, wherein said means for entering period of silence act periodically.

49. The apparatus of claim 46 further comprising:
(b) means for invoking repeated use of said means (d) and (f) several times before invoking said means (a).

50. The apparatus of claim 46, wherein said level of loading is proportional to $$\frac{G_a - G_n}{G_a}$$

wherein $G_n$ is equal to said first gain setting and wherein $G_a$ is equal to said second gain setting.

51. The apparatus of claim 46, further comprising:
(b) means for using said level of loading in an admission method which admits or denies access to said system.

52. The apparatus of claim 46, further comprising:
(b) means for using said level of loading in a data rate determination method which controls a data rate at which remote units access said system.

53. A base station, comprising:
(a) a receiver, configured to receive signals from remote units;
(b) a transmitter, configured to transmit signals to said remote units;
(c) an automatic gain control acting on a signal provided by said receiver; and
(d) a processor, communicatively coupled to said automatic gain control and said transmitter, said processor having been configured to:
  (i) provide signals to said transmitter, said signals indicating a period of silence, and a period of normal operation;
  (ii) evaluate during said period of silence, a first gain setting of said automatic gain control;
  (iii) evaluate during said period of normal operation, a second gain setting of said automatic gain control; and
  (iv) determine a level of loading based upon said first and second gain settings.

* * * * *